United States Patent [19]

Meiners

[11] Patent Number: 4,550,556
[45] Date of Patent: Nov. 5, 1985

[54] SYSTEM FOR INJECTION OF LIQUID OR GRANULAR MATERIAL INTO A ROUND HAY BALE

[75] Inventor: Elmo R. Meiners, Anchor, Ill.

[73] Assignee: M & W Gear Company, Gibson City, Ill.

[21] Appl. No.: 617,251

[22] Filed: Jun. 4, 1984

[51] Int. Cl.⁴ .................. A01D 39/00; A01D 75/00
[52] U.S. Cl. .......................... 56/341; 56/DIG. 5; 100/88
[58] Field of Search ............... 56/341, 364, DIG. 5; 100/88, 89, 5

[56] References Cited

U.S. PATENT DOCUMENTS

| | | | |
|---|---|---|---|
| 331,932 | 12/1885 | Workman | 100/89 |
| 1,691,865 | 11/1928 | Wolf | 100/88 |
| 2,336,491 | 12/1943 | Luebben | 56/341 |
| 2,774,296 | 12/1956 | Martinmaas, Jr. | 100/5 |
| 2,970,423 | 2/1961 | Wenzel | 56/341 |
| 2,975,581 | 3/1961 | Matthies | 56/341 |
| 3,018,718 | 1/1962 | Wenzel | 56/341 |
| 3,044,243 | 7/1962 | Wenzel | 56/341 |
| 3,534,537 | 10/1970 | Buchele et al. | 56/341 |
| 3,792,574 | 2/1974 | Best | 56/341 |
| 3,815,344 | 6/1974 | Kucera | 56/341 |
| 3,834,141 | 9/1974 | Bracht et al. | 56/341 |
| 3,837,159 | 9/1974 | Vermeer | 56/341 |
| 3,894,484 | 7/1975 | Anstey et al. | 100/5 |
| 3,899,964 | 8/1975 | Molitorisz | 100/89 |
| 3,913,473 | 10/1975 | Meiers | 100/5 |
| 3,938,652 | 2/1976 | Sacht et al. | 56/341 |
| 3,968,633 | 7/1976 | Gaeddert et al. | 56/341 |
| 3,974,632 | 8/1976 | Van der Lely | 56/341 |
| 4,009,653 | 3/1977 | Sacht | 100/88 |
| 4,022,003 | 5/1977 | Strausser et al. | 56/341 |
| 4,022,120 | 5/1977 | McAllister | 100/5 |
| 4,024,804 | 5/1977 | Hanson | 100/5 |
| 4,078,733 | 3/1978 | Popiolek | 241/200 |
| 4,082,192 | 4/1978 | Cox | 214/1 HA |
| 4,119,026 | 10/1978 | Sacht | 100/89 |
| 4,137,697 | 2/1979 | Knapp et al. | 56/341 |
| 4,173,112 | 11/1979 | Meiners | 56/341 |
| 4,176,596 | 12/1979 | Sacht | 100/88 |
| 4,205,514 | 6/1980 | Wolrab | 56/341 |
| 4,212,149 | 7/1980 | Krone et al. | 100/88 |
| 4,228,638 | 10/1980 | Rabe et al. | 56/341 |
| 4,240,339 | 12/1980 | Simonis | 100/5 |
| 4,246,743 | 1/1981 | Anstee et al. | 56/341 |
| 4,296,595 | 10/1981 | Meiners | 56/341 |
| 4,352,267 | 10/1982 | Mellinger | 56/341 |

FOREIGN PATENT DOCUMENTS

| | | | |
|---|---|---|---|
| 2602231 | 7/1977 | Fed. Rep. of Germany | |
| 3232746 | 3/1984 | Fed. Rep. of Germany | 56/341 |
| 818838 | 10/1937 | France | |
| 2088487 | 6/1982 | United Kingdom | 56/341 |
| 2102335 | 2/1983 | United Kingdom | |
| 728777 | 4/1980 | U.S.S.R. | 56/341 |

Primary Examiner—Robert P. Swiatek
Assistant Examiner—David L. Tarnoff
Attorney, Agent, or Firm—Allegretti, Newitt, Witcoff & McAndrews, Ltd.

[57] ABSTRACT

A round hay baler includes a forward pick-up assembly and hold down tines for gathering and introducing a layer of material into the baler. The hold down assembly includes fluid discharge tines extending from a hollow manifold connected to a reservoir that contains preservatives, nutrients or biological inhibitors, for example, which are added to the inside of the layer forming the round hay bale.

7 Claims, 3 Drawing Figures

SYSTEM FOR INJECTION OF LIQUID OR GRANULAR MATERIAL INTO A ROUND HAY BALE

BACKGROUND OF THE INVENTION

This invention relates to an improved round bale forming machine and more particularly to a round bale forming machine which includes apparatus for introduction of preservatives, nutrients, and other fluid materials into the round bale as it is being formed.

Currently various round bale forming machines have been available or proposed for gathering agricultural material, forming that material into a round bale, and discharging the bale from the machine. Typical of the balers available are those depicted in U.S. Pat. No. 4,009,653 and U.S. Pat. No. 4,212,149. Generally such balers include a housing which is separable into two portions. The housing or shell generally has the shape of an enclosed cylinder with rollers, belts or other types of round bale forming means within the shell. Typically, a layer of hay, stray or other field grown material is fed into the shell and formed or rolled into a cylindrical round bale as the baler is drawn through the field by a prime mover. Generally the layer of straw or other material is gathered by a pick-up assembly such as a rotating wheel with a series of radially projecting tines. As the wheel rotates, it gathers the layer of hay and transports it upwardly and rearwardly into the interior of the shell of the baler. There the hay is formed into a compacted cylindrical mass. The above referenced patents describe such apparatus and are incorporated herewith by reference.

It has been found that round hay bales formed by such balers generally need not be stored inside a barn and they also have a relatively long field life. Thus, they may be stored in a field since the outside layers of the bale act as a protective coating or shell for the bale. To enhance field storage, however, it has been suggested in Meiners, U.S. Pat. No. 4,173,112 and No. 4,296,595 that a mechanism be provided for wrapping each round hay bale in a layer of plastic. While this does enhance the storage capability of such round bales by protecting them against the elements, the cost of the application of plastic may be undesirably high. Thus, alternatives have been sought to increase the field life of a round hay bale and to otherwise improve the storability and quality of the bale. The present invention contemplates a manner to enhance the quality of round bales both during and after their formation.

SUMMARY OF THE INVENTION

Briefly, the invention comprises a mechanism and method for introducing fluid material onto a layer of bale material prior to its being formed and included in the bale. Specifically, the mechanism is incorporated with the hay baler adjacent the pick-up mechanism and may include a manifold with a series of fluid dispensing tubes arranged transversely over the layer of material being baled. The tubes are designed for dispensing fluids such as preservatives, nutrient additives or inhibitors to prevent biological degradation of the baled material. Typically the baler will include a reservoir mounted thereon for the fluid and a means for transporting the fluid from the reservoir through the dispensing tubes preferably in a measured manner. In a preferred embodiment, the pick-up assembly for picking the layer of material cooperates with a hold down tine assembly which simultaneously serves as a fluid discharge mechanism. The fluid which is stored in the reservoir and discharged through the fluid discharge or ejector mechanism may be either liquid or solid particulate material. Generally the fluid is discharged to the top of the layer of material which is being fed into the baler by the pick-up assembly. In most balers, this pickup assembly is situated at the forward end of the baler and is adapted to pick up material as the baler is transported through a field by a prime mover such as tractor.

Thus, it is an object of the present invention to provide an improved round hay baler.

It is further object of the present invention to provide the improvement in a round hay baler of an assembly which is adapted to add fluid nutrients, preservatives, inhibitors and other fluid materials to the layer of material being baled as that material is being fed into the baler.

Still another object of the invention is to provide a mechanism for fluid injection onto a layer of material which is being baled by a round hay baler.

One further object of the invention is to provide a round hay baler which includes a reservoir for storage of fluid to be discharged onto the round hay bale as the bale is being formed and which also includes means for transporting and ejecting the fluid from the reservoir onto the bale material.

Still a further object of the invention is to provide an assembly which may be incorporated with existing round hay balers for the purpose of ejecting fluid onto the baled material as the bale is being formed.

These and other objects, advantages and features of the invention will be set forth in the detailed description which follows.

BRIEF DESCRIPTION OF THE DRAWING

In the detailed description which follows, reference will be made to the drawing comprised of the following figures.

DESCRIPTION OF THE PREFERRED EMBODIMENT

Figure 1:
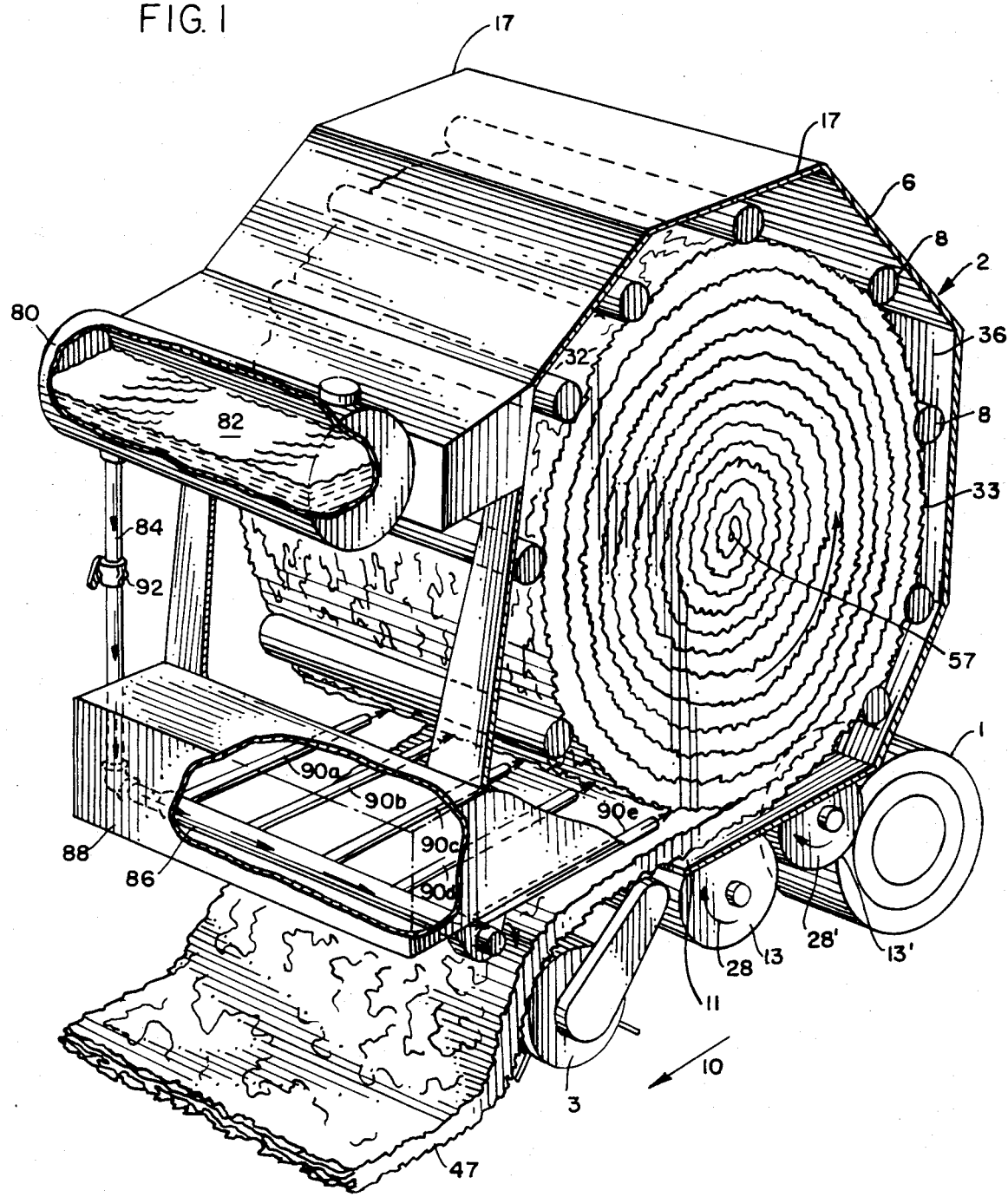
FIG. 1 is a perspective view illustrating a first preferred embodiment of the invention as well as the manner of practicing the invention.

The subject matter of the present invention constitutes an improvement which may be incorporated with round hay balers of almost any type and description. With respect to the particular embodiment of the present invention, reference, however, is directed to U.S. Pat. No. 4,212,149 in the name of Krone, et al for a Crop Baling Machine dated July 15, 1980. This U.S. patent, incorporated herewith by reference, includes a description of a typical baling machine for the formation of round bales. Referring to FIG. 1, a chassis or running gear 1 carries a bale forming chamber or bale forming compartment 2 in which a round bale is formed. The compartment 2 is substantially closed on all sides and has the basic shape of a horizontal cylinder with a cylindrical axis 5 extending horizontally and transversely to the direction of baler travel 10. Flat end faces of the winding compartment 2 are defined by spaced end walls 36 which are generally parallel to one another and plain or smooth, at least on the inside, connected by cylindrical boundary wall 6. To permit the chamber 2 to be opened, the walls 36 are divided into two portions and comprise a stationary wall portion 32 and a movable wall portion 33 which is pivotally movable about pivot bearings 17 to open the rear portion of the chamber 2 for ejection of a bale therefrom.

An intake gap 11 is defined in the lower front region of the chamber or compartment 2. It is through this opening 11 that harvested crops picked up from the ground are introduced into the compartment 2. A pick-up device or assembly 3 is positioned in front of the gap 11 for picking harvested crops and introducing a layer of those crops into the chamber 2. Disposed downstream or behind the pick-up device 3 are two conveying rollers 13 and 13' which rotate adjacent one another and about spindles aligned parallel to the axis 5. The surface portions of the rollers 13 and 13' serve to define part of a peripheral boundary for the crop and move the crop from the pick-up device 3 rearwardly with respect to the direction of travel 10 into the compartment 2. The rollers 13 and 13' as well as the pick-up device 3 extend the full transverse width of a layer or swath 47 of harvested crop. The direction of rotation of the rollers 13 and 13' is indicated by the arrows 28 and 28', respectively.

The inner surface of the boundary wall 6 of the chamber or compartment 2 is swept by a conveying device or endless conveyor which consists of endless drive chains (not shown) that carry transverse conveying slats or rollers 8 that are supported between the two spaced drive chains (not shown).

The specific construction of the particular bale forming mechanism schematically illustrated in FIG. 1 is shown in greater detail in U.S. Pat. No. 4,212,149. Moreover, the construction so far illustrated and described is a known construction and does not in and of itself constitute the present invention.

Rather, the present invention relates to the construction of a hold down and/or ejector assembly which is provided adjacent the pick-up assembly 3. The improved hold down and/or ejector assembly is for the purpose of ejecting fluid onto the top of layer 47. Thus, referring again to FIG. 1, the assembly of the present invention includes a reservoir tank 80 which is mounted on the forward side of the housing or baler wall 6. The tank 80 has a sufficient capacity and size to hold liquid or particulate material 82 above the layer 47. A conveyor conduit or tube 84 leads from the reservoir 80 and connects with a transverse manifold member or pipe 86 mounted fixedly above the swath 47 by attachment to the frame or carriage 88 of the baler. A series of hollow, longitudinally extending discharge tubes 90a-90e connect from the hollow manifold 86 and extend rearwardly opposite the direction of travel 10 over the swath 47. The manifold 86 and discharge tubes 90a-90e may also serve a dual function by acting as a hold down bar to maintain the layer 47 in a uniform compact thickness as it is being introduced into the compartment 2. To perform a hold down function, the manifold 86 and attached tines or tubes 90a-90e are biased or weighted to pivot in the clockwise direction as illustrated in FIG. 1.

Importantly, the ends or sides of the tubes 90a-90e include openings for ejection of fluid such as liquid or particulate material. The material which flows from the tank 80 through the conduit 84, the manifold 86, and discharge tubes 90a-90e may be a preservative which helps to prevent biological degradation of the bale. Another material which may be ejected into the bale is nutrient additives which are introduced into the bale so that when the bale is provided as feed for animal stock, nutrient additives are already included in the feed. Other types of inhibitors, additives and other materials to provide desired effects on the bale may also be ejected from the mechanism described.

A flow control valve 92 is provided in the line 84 to control the flow rate from the tank 80 through the tubes 90a-90e. In the embodiment shown, flow is, at least in part, dependent upon gravity. It is possible, however, to replace the valve 92 with a pump mechanism which will provide a measured and controlled amount of discharge through the ejector mechanism. Also, it is possible to pressurize the inside of the tank 80 in order to effect and control the flow of material from the tank 80.

In the practice of the invention, fluid is ejected from the ends or sides of the tubes 90a-90e depending upon the placement of openings in those tubes. Preferably the tubes 90a-90e extend longitudinally from the manifold 86, although it is possible to eliminate the discharge tubes and just have manifold openings in the manifold 86. It is also possible to have a different array of discharge elements other than tubes as depicted in the drawing. In any event, the discharge of the material or fluid is effected to the top of the swath or layer 47 so that the additive is generally folded or incorporated onto the inside of the formed bale and so that it remains encapsulated within the bale and will slough off from the bale particularly after the bale is discharged from the baler.

Figure 2:
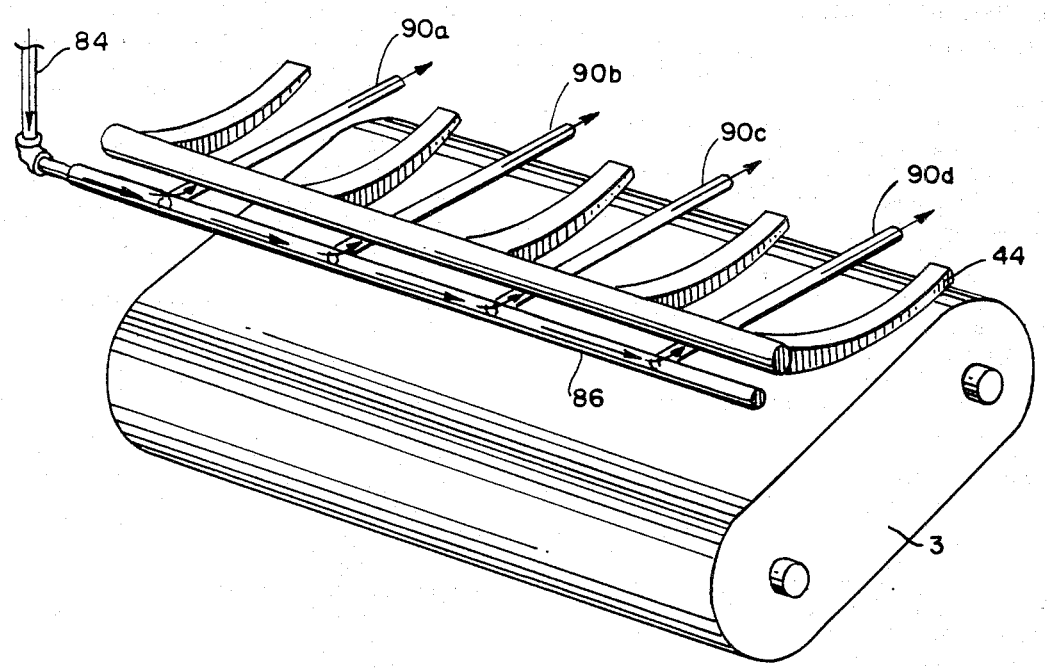
FIG. 2 is a partial perspective view of an alternative construction or embodiment of the invention.

FIG. 2 illustrates an alternative embodiment of the invention. In FIG. 2, a pick-up assembly 3 is illustrated schematically. In the embodiment of FIG. 2, however, the hold down tine assembly 94 is separate from the fluid discharge, ejector assembly or manifold assembly 86. Thus, in the embodiment of FIG. 2 the ejector tubes 90a-90e can be positioned in such a manner that they do not necessarily bias against a swath or layer of material being baled. By contrast, the hold down bar 94 will be biased in order to compact or at least control the thickness of the swath or layer 47.

Figure 3:
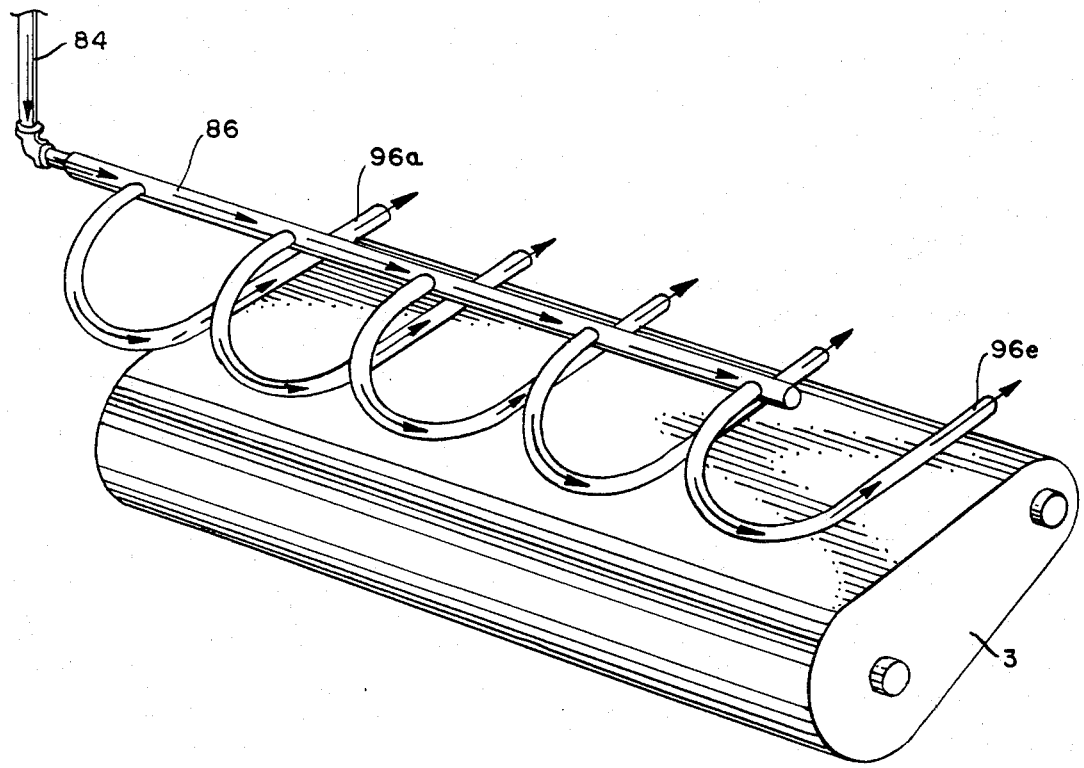
FIG. 3 is a further alternative embodiment of the invention.

FIG. 3 illustrates yet another alternative of the construction of the ejector. Again, the pick-up assembly 3 is shown juxtaposed with respect to the ejector mechanism. In the embodiment of FIG. 3, the ejector mechanism incorporates curved discharge tubes 96a-96e. These tubes 96a-96e may or may not be resilient in order to act as compacting or hold down tines.

There has been described a preferred embodiment of the invention. Various alternatives of the invention are possible. For example, the pick-up assembly may be at the rear rather than at the forward end of a baler. The manifold assembly may be varied considerably and positioned upstream or downstream with respect to a separate hold down tine assembly. Therefore, the invention is to be limited only by the following claims and their equivalents.

What is claimed is:

1. In a round baler of the type including a housing, running gear for supporting the baler in a field and for pulling the baler through the field, bale forming means cooperative with the housing, bale discharge means for discharge of a formed bale from the housing, and a pick-up assembly for directing material to be baled into bale forming means, said pick-up assembly including means for feeding a layer of material from field level into the bale for forming a round bale, said layer having a transverse dimension, the improvement in combination of:

a hold down assembly for the means for feeding material into the baler, said hold down assembly comprising a plurality of hollow tines positioned against the top of the layer as the layer enters the baler, said tines being directed toward the flow of material into the baler, said hold down assembly further comprising a manifold tube transverse to the layer, said hollow tines being connected from the manifold for simultaneously holding the top side of the layer and for dispersing liquid or particulate matter on and into the layer prior to forming the layer into a round bale, each of said hollow tines including at least one ejector outlet for said liquid or particulate matter.

2. The baler of claim 1 wherein the layer has a top side and the ejector outlets are positioned for ejection of matter onto the top side, said bale forming means comprising means to fold the layer into a spiral roll with the top side of the layer toward the center of the roll.

3. The baler of claim 1 including a fluid reservoir mounted on the baler and means connecting the reservoir with the ejector means for transport of fluid from the reservoir to the ejector means.

4. The baler of claim 1 including a fluid resrvoir mounted on the baler and means connecting the reservoir to the manifold tube.

5. The baler of claim 1 wherein the ejector outlets are at the end of each tine tube, each tine tube extending longitudinally in the direction of travel of the layer into the baler.

6. The baler of claim 3 including means for transporting fluid from the reservoir through the ejector means.

7. The baler of claim 1 wherein said hold down assembly in pivotally biased downward against the top of the layer.

* * * * *